(12) United States Patent
Liu et al.

(10) Patent No.: US 11,714,591 B2
(45) Date of Patent: Aug. 1, 2023

(54) DISPLAY CONTROL METHOD AND SYSTEM, MOBILE TERMINAL, AND STORAGE MEDIUM

(71) Applicant: BEIJING XIAOMI MOBILE SOFTWARE CO., LTD., Beijing (CN)

(72) Inventors: Lijun Liu, Beijing (CN); Qun Chang, Beijing (CN); Chunyi Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/683,298

(22) Filed: Feb. 28, 2022

(65) Prior Publication Data

US 2023/0043742 A1 Feb. 9, 2023

(30) Foreign Application Priority Data

Aug. 6, 2021 (CN) .......................... 202110903645.6

(51) Int. Cl.

| | |
|---|---|
| *G06F 3/0481* | (2022.01) |
| *G06F 3/14* | (2006.01) |
| *G06F 3/0484* | (2022.01) |
| *G06F 3/0483* | (2013.01) |
| *G06F 3/0488* | (2022.01) |
| G06F 9/451 | (2018.01) |
| G06F 3/04886 | (2022.01) |

(52) U.S. Cl.
CPC .............. *G06F 3/14* (2013.01); *G06F 3/0481* (2013.01); *G06F 3/0483* (2013.01); *G06F 3/0484* (2013.01); *G06F 3/0488* (2013.01); *G06F 3/04886* (2013.01); *G06F 9/451* (2018.02); *G06F 9/452* (2018.02); *G06F 2203/04803* (2013.01); *G06F 2203/04804* (2013.01)

(58) Field of Classification Search
CPC ........ G06F 3/14; G06F 3/0481; G06F 3/0484; G06F 2203/04803
See application file for complete search history.

(56) References Cited

U.S. PATENT DOCUMENTS

| | | | |
|---|---|---|---|
| 9,047,102 | B2 | 6/2015 | Liu |
| 9,317,195 | B1 | 4/2016 | Grechishkin et al. |
| 10,318,320 | B1 * | 6/2019 | Thomas .............. G06F 9/45558 |
| 10,812,974 | B2 * | 10/2020 | Mu ...................... H04W 12/041 |
| 11,120,765 | B1 * | 9/2021 | Agrawal .............. G06F 3/0488 |

(Continued)

FOREIGN PATENT DOCUMENTS

WO    2021036651 A1    3/2021

OTHER PUBLICATIONS

The Extended European Search Report issued in Application No. 22161143.7 dated Sep. 2, 2022, (11p).

*Primary Examiner* — Tuyetlien T Tran
(74) *Attorney, Agent, or Firm* — Arch & Lake LLP

(57) ABSTRACT

A display control method and system, a mobile terminal, and a storage medium are provided. The method includes: acquiring a trigger event, the trigger event including at least one of: an event generated by triggering a first display interface or an event generated by triggering a second display interface; acquiring a target display area corresponding to the trigger event; reporting the trigger event to a desktop launcher corresponding to the target display area, so that the desktop launcher starts an interface corresponding to the trigger event in the target display area.

10 Claims, 8 Drawing Sheets

(56) References Cited

U.S. PATENT DOCUMENTS

| | | | |
|---|---|---|---|
| 2005/0015731 A1* | 1/2005 | Mak | G06F 3/0486 |
| | | | 715/764 |
| 2006/0242602 A1* | 10/2006 | Schechter | G06F 9/451 |
| | | | 715/838 |
| 2012/0005269 A1 | 1/2012 | Janssen et al. | |
| 2013/0290856 A1* | 10/2013 | Beveridge | G06F 3/1454 |
| | | | 715/740 |
| 2014/0075377 A1* | 3/2014 | Kang | G06F 3/04842 |
| | | | 715/788 |
| 2014/0258155 A1* | 9/2014 | Suryanarayanan | |
| | | | H04L 67/1021 |
| | | | 726/29 |
| 2019/0065018 A1* | 2/2019 | Keam | G06F 3/147 |
| 2019/0295498 A1* | 9/2019 | Lee | G06F 3/04886 |
| 2020/0042274 A1* | 2/2020 | Park | G06F 3/04883 |
| 2020/0192683 A1* | 6/2020 | Lin | G06F 3/04817 |
| 2020/0213438 A1* | 7/2020 | Liu | G06F 3/04886 |
| 2021/0096887 A1* | 4/2021 | Klein | G09G 5/14 |
| 2021/0405828 A1* | 12/2021 | Jiang | G06F 1/1613 |
| 2022/0164091 A1* | 5/2022 | Kang | H04M 1/72412 |
| 2022/0179455 A1* | 6/2022 | Zhu | G06F 1/1641 |
| 2022/0197584 A1* | 6/2022 | Zheng | G06F 3/04817 |

\* cited by examiner

DISPLAY CONTROL METHOD AND SYSTEM, MOBILE TERMINAL, AND STORAGE MEDIUM

CROSS REFERENCE TO RELATED APPLICATION

The present application is based on and claims the priority of the Chinese patent application with the application number of 202110903645.6 and the filing date of Aug. 6, 2021, the entire content of which is incorporated herein by reference for all purposes.

TECHNICAL FIELD

The present disclosure relates to the field of display technology, and in particular, to a display control method and system, a mobile terminal, and a storage medium.

BACKGROUND

At present, resources in the mobile terminal are more and more abundant, and the application scenarios thereof are also more and more abundant. For example, the mobile terminal may be connected to an external monitor. At this time, the first desktop interface may be displayed on the mobile terminal, and the first desktop interface adopts a fullscreen display mode. In the meanwhile, the second desktop interface may be displayed on the external display, and the second desktop interface adopts a freeform mode.

SUMMARY

The present disclosure provides a display control method and system, a mobile terminal, and a storage medium to solve deficiencies in the related art.

According to a first aspect of the present disclosure, a display control method is provided, applied to a mobile terminal. The mobile terminal includes a first display interface, a second display interface and a desktop launcher. The second display interface is located over the first display interface. The display systems of the first display interface and the second display interface are different. The display control method includes: acquiring a trigger event, the trigger event including at least one of an event generated by triggering the first display interface and an event generated by triggering the second display interface; acquiring a target display area corresponding to the trigger event, the target display area including at least one of a first display area located within the first display interface and a second display area located within the second display interface area; and reporting the trigger event to the desktop launcher corresponding to the target display area, such that the desktop launcher starts an interface corresponding to the trigger event in the target display area.

According to a second aspect of the present disclosure, a mobile terminal is provided, including: a first display interface, a second display interface and a desktop launcher, wherein the second display interface is located over the first display interface, and the first display interface and the second display interface comprise different display systems; a processor; and a memory, configured to store a computer program executable by the processor, where the processor is configured to run the computer program in the memory to implement the display control method according to the first aspect of the present disclosure.

According to a third aspect of the present disclosure, a computer-readable storage medium is provided. When an executable computer program in the storage medium is run by a processor, the display control method as described in the first aspect of the present disclosure.

It is to be understood that the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of the present specification, illustrate examples consistent with the present disclosure and together with the present description serve to explain the principle of the present disclosure.

DETAILED DESCRIPTION

Figure 1:
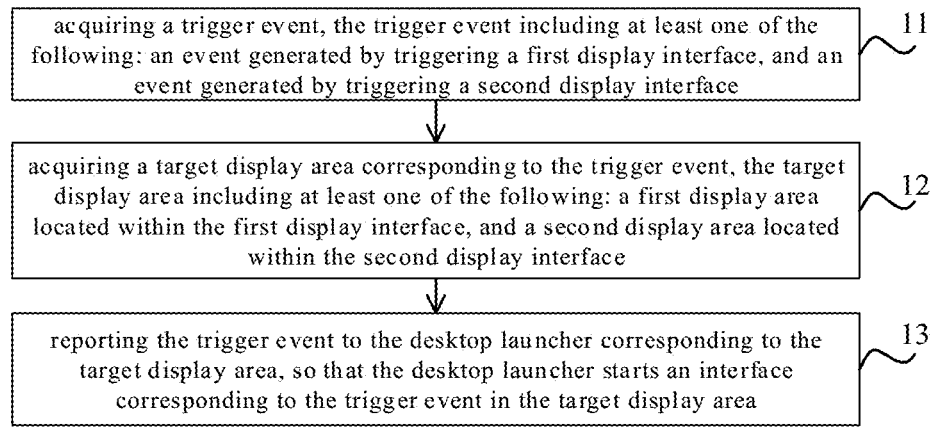
FIG. 1 is a flow chart of a display control method according to one or more examples of the present disclosure.

Exemplary embodiments will be described in detail herein, examples of which are illustrated in the accompanying drawings. Where the following description refers to the drawings, the same numerals in different drawings refer to the same or similar elements, unless otherwise indicated. The illustratively described embodiments below are not intended to represent all embodiments consistent with the present disclosure. Rather, they are merely examples of device consistent with some aspects of the present disclosure, as recited in the appended claims. It should be noted that, in the case of no conflict, the features in the following embodiments and implementations may be combined with each other.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

After the mobile terminal is connected to the external display, two display interfaces, namely, the first desktop interface and the second desktop interface, will appear on the mobile terminal. The first display interface remains displayed on the display screen of the mobile terminal, and the second display interface is displayed on the external display screen. When the user triggers an application icon in the first display interface, the application interface will be displayed on the display screen of the mobile terminal. When the user triggers an application icon in the second display interface, the application interface will be displayed on the external display screen. In this way, according to the above solution, the first display interface and the second display interface do not affect each other, which improves the view effect.

However, the solution in the related art requires an external display screen as a carrier for display, and two display interfaces and application programs are displayed on the two display screens respectively. This increases the difficulty of operation.

Examples of the present disclosure provide a display control method, which may be applied to a mobile terminal. The mobile device includes but is not limited to: tablet computer, smart phone, personal computer, smart TV and other devices. In an example, the mobile device may include a foldable display screen, and a typical mobile terminal including a foldable screen may include a foldable mobile phone.

In some examples, the mobile device may be a foldable flexible device or a non-flexible device that provides folding functionality. In an example of the present disclosure, the display screen may be a foldable screen. Exemplarily, the display screen is a flexible screen or a foldable screen with two hard screen areas connected by a hinge.

Exemplarily, if the display screen is a flexible screen with a larger area, the flexible screen allows the mobile device to switch between the folded posture and the unfolded posture. A hinge module may also be provided in a mobile device including a flexible screen, to assist bending of the flexible screen and provide a support force after the flexible screen is bent.

In some examples, whether the display screen is folded or not and the degree of folding reflect the different usage needs of users.

Therefore, in an example of the present disclosure, the operating system running on the mobile device is determined according to the current posture of the display screen. The device supports a first display system and a second display system. The first display system and the second display system are different operating systems. Exemplarily, differences between the first display system and the second display system may be embodied in any one of the following aspects.

The system kernels of the first display system and the second display system are different.

The average consumption resources for operation of the first display system and the second display system are different.

The display interfaces of the first display system and the second display system are different. Some system display interfaces are suitable for horizontal screen devices, and some system display interfaces are suitable for vertical screen devices. A typical device involving many vertical screen usage scenarios is a mobile phone. A typical horizontal screen usage scenario may include a tablet computer and/or a PC.

Exemplarily, the first display system may be a PC operating system that supports multitasking and multiple windows, and the second display system may be a mobile phone operating system that does not support multitasking and multiple windows.

In an example of the present disclosure, a display control method is provided based on the foldable mobile phone. FIG. 1 is a flowchart of a display control method according to an example. Referring to FIG. 1, the display control method includes: Step 11 to Step 13.

In step 11, a trigger event is acquired. The trigger event includes at least one of the following: an event generated by triggering a first display interface, and an event generated by triggering a second display interface.

In an example, the display screen of the mobile terminal has a display interface, which is hereinafter referred to as the first display interface. Before acquiring the trigger event, the mobile terminal may create a virtual display at the operating system layer, such that the virtual display displays another display interface on the display screen, which is referred to as the second display interface in the following examples. It should be understood that different display systems may be used in the first display interface and the second display interface. Alternatively, in other words, the first display interface and the second display interface have their own desktop launchers, and each desktop launcher starts the respective display system. The first display interface corresponds to the first display system, and the second display interface corresponds to the second display system. For example, the display system in the first display interface may use a PC operating system, and its application programs may be arranged in an order from left to right. The display system in the second display interface may adopt a mobile phone operating system, and its application programs may be arranged in an order from top to bottom. Those skilled in the art may select an appropriate display system according to specific scenarios, and corresponding solutions fall within the protection scope of the present disclosure.

Figure 2:
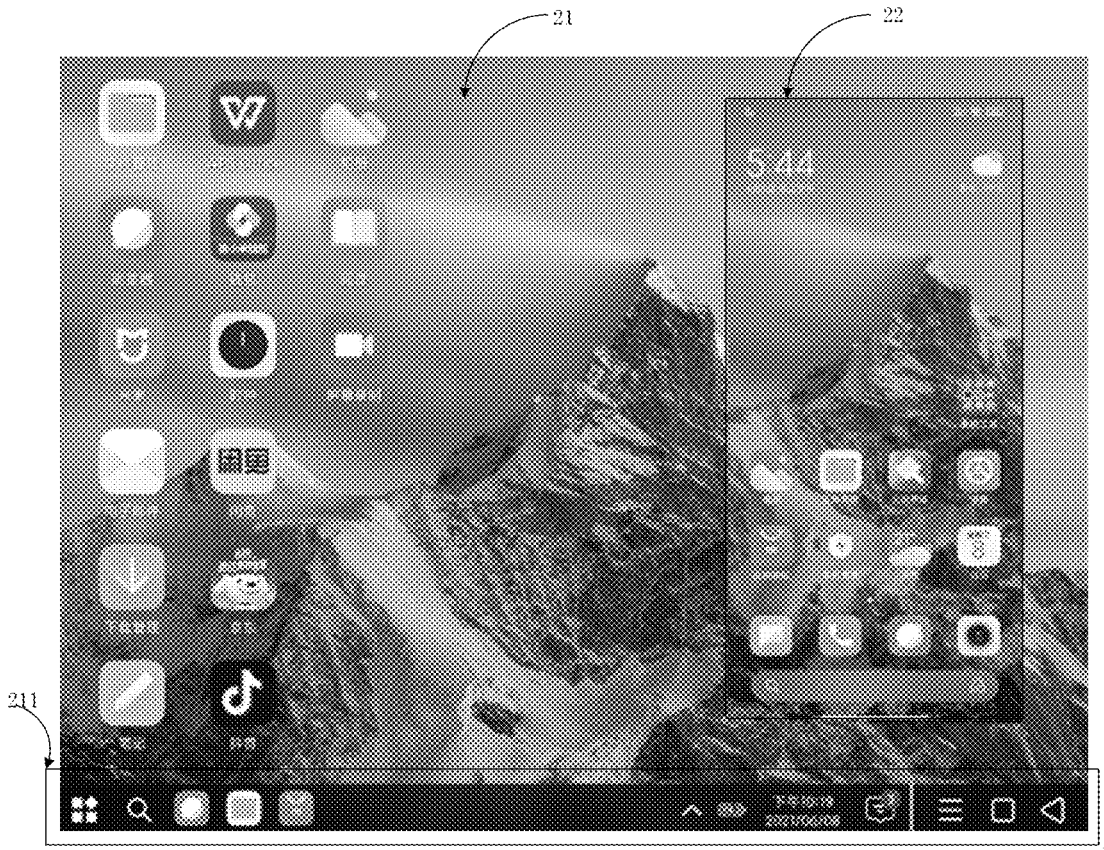
FIG. 2 is a schematic diagram showing a display effect according to one or more examples of the present disclosure.

It should be understood that when the second display interface is located on the first display interface, the display content in the second display interface is also superimposed on the display content in the first display interface, the display effect of which is shown in FIG. 2. FIG. 2 shows the first display interface 21 and the second display interface 22, where the second display interface 22 is superimposed over the first display interface 21. For the convenience of description, the solution of each example is described in the following by using the line diagram implemented based on FIG. 2.

Figure 3:
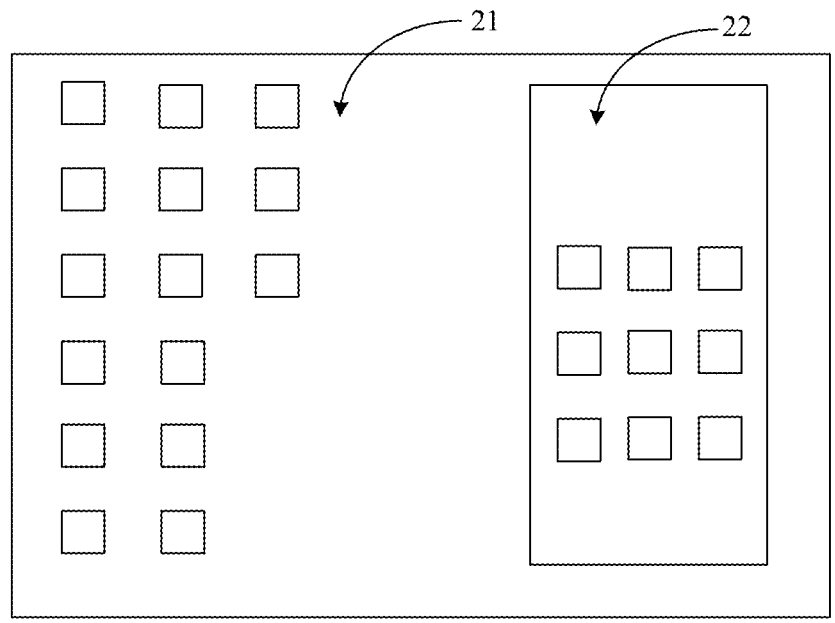
FIG. 3 is a schematic diagram showing a display effect according to one or more examples of the present disclosure.

Referring to FIG. 3, several applications (each represented by a rectangular frame) may be displayed in the first display interface 21, several applications (each represented by a rectangular frame) may be displayed in the second display interface 22, and applications the first display interface 21 and the second display interface 22 may be arranged in different arrangements. For example, applications in the first display interface 21 may be arranged in accordance with an arrangement for tablet computer. That is, all the applications are arranged on the left side of the first display interface 21. Still for example, applications in the second display interface 22 may be arranged according to an arrangement for smart phone. That is, all the applications are arranged according to an M*N arrangement. Settings of the remaining applications are on the next page. In this way, the user may select one of the above arrangements according to their own usage habits, that is, to select a customary display system. This is convenient for quickly locating the desired application, and beneficial to improve the positioning efficiency and the use experience.

It should also be noted that applications contained in the first display interface and the second display interface may be the same, but the arrangements are different. Apparently, applications contained in the first display interface and the second display interface may be different. For example, applications in the second display interface may be updated according to the usage frequency of the applications or arranged according to pre-configured data. The technical personnel may set the applications included in each display interface according to specific scenarios, which is not limited herein.

In an example, during the display process, the display screen of the mobile terminal may detect the user's trigger operation in real time or according to a preset period. The above-mentioned trigger operation may include but is not limited to: long press, slide, single click, double click, etc. This may be set according to specific scenarios, which is not limited herein. When the display screen detects a trigger operation, a trigger event may be generated. The trigger event may include at least one of the following: an event generated by triggering the first display interface, and an event generated by triggering the second display interface. For example, the trigger event refers to an event generated by triggering the first display interface, which may include starting an application in the first display area or switching an interface in the first display area. For another example, the trigger event refers to an event generated by triggering the second display interface, which may include starting an application in the second display area or switching an interface in the second display area.

It should be noted that the above trigger event may include but is not limited to the following: the location of the trigger operation, the type of the trigger operation, the time of the trigger operation, etc., which may be set according to specific scenarios and are not limited herein.

In an example, the processor of the mobile terminal may communicate with the display screen to acquire a trigger event uploaded by the display screen.

In step 12, a target display area corresponding to the trigger event is acquired. The target display area includes at least one of the following: a first display area located within the first display interface, and a second display area located within the second display interface.

In an example, after acquiring the above trigger event, the processor of the mobile terminal may process the trigger event. For example, the trigger event may be parsed according to a preset policy (which is settable), or a target content may be read from the specified position in the trigger event. Thereby, the content included in the trigger event, such as the location of the trigger operation, is acquired. Then, the processor may compare the position of the trigger operation with the boundary between the first display interface and the second display interface, so as to determine which display interface the position of the trigger operation is located in. That is, the processor may acquire the target display area corresponding to the trigger event. That is, the target display area includes at least one of the following: a first display area located within the first display interface, and a second display area located within the second display interface.

In step 13, the trigger event is reported to the desktop launcher corresponding to the target display area, so that the desktop launcher starts an interface corresponding to the trigger event in the target display area.

In an example, the mobile terminal may include two desktop launchers. The first desktop launcher is used to launch the desktop interface or display system in the first display interface, and the second desktop launcher is used to start the desktop interface or display system in the second display interface. It should be understood that, the second desktop launcher is created by the operating system layer of the mobile terminal when the virtual display is created. In other words, the mobile terminal includes a first desktop launcher for processing a trigger event from the first display interface and a second desktop launcher for processing a trigger event from the second display interface.

In an example, the processor of the mobile terminal may report the trigger event to the desktop launcher of the display interface corresponding to the target display area. For example, when the trigger event comes from the first display interface, the processor may send the trigger event to the first desktop launcher. For another example, when the trigger event comes from the second display interface, the processor may send the trigger event to the second desktop launcher. In this way, the desktop launcher may launch the display interface corresponding to the trigger event in the target display area.

Figure 4:
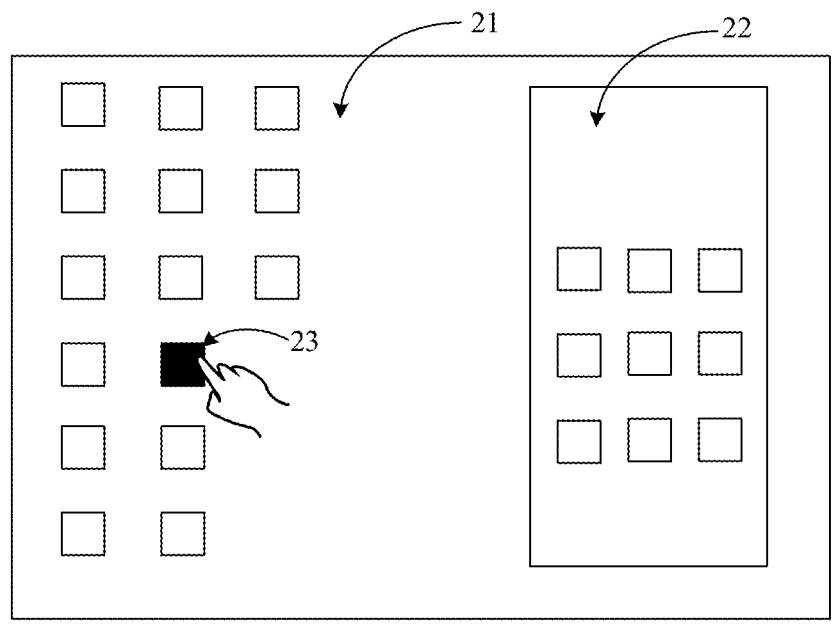
FIG. 4 is a schematic effect diagram showing triggering of an application program startup interface according to one or more examples of the present disclosure.

In an example, in response to the trigger event generated by triggering the first display interface, the desktop launcher may acquire an operation type corresponding to the trigger operation. The above-mentioned operation type includes an application startup type. In response to the acquired operation type being the application startup type, the desktop launcher may display a pop-up window in the first display interface in a freeform or fullscreen mode. At the same time, the desktop launcher may display the newly started application in the task bar of the first display interface (the area shown by a rectangular box 211 in FIG. 2). Referring to FIG. 4, when the mobile terminal detects that the user clicks on the application 23, the above-mentioned pop-up window and the second display interface may be arranged according to a target position relationship. The target position relationship may include at least one of the following.

Figure 5:
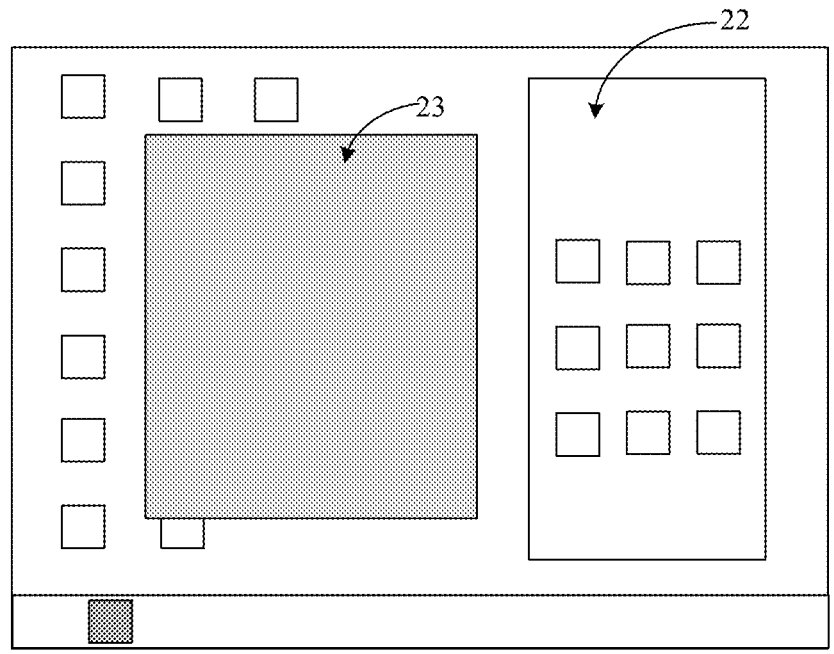
FIG. 5 is a schematic effect diagram showing displaying of a pop-up window and a second display interface side by side according to one or more examples of the present disclosure.

The pop-up window is juxtaposed with the second display interface, the effect of which is shown in FIG. 5. At this time, there is no overlap between the pop-up window corresponding to the application 23 and the second display interface.

Figure 6:
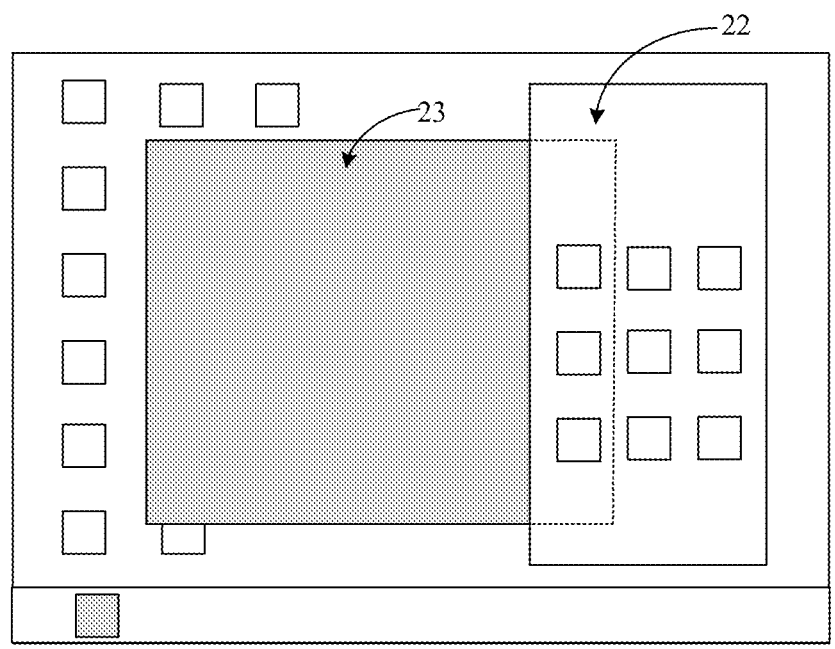
FIG. 6 is a schematic effect diagram showing overlapping portions between a pop-up window and a second display interface according to one or more examples of the present disclosure.

There is an overlap between the pop-up window and the second display interface, the effect of which is shown in FIG. 6. At this time, the pop-up window corresponding to the application 23 overlaps with the second display interface (the part shown by a dotted line in FIG. 6).

Figure 7:
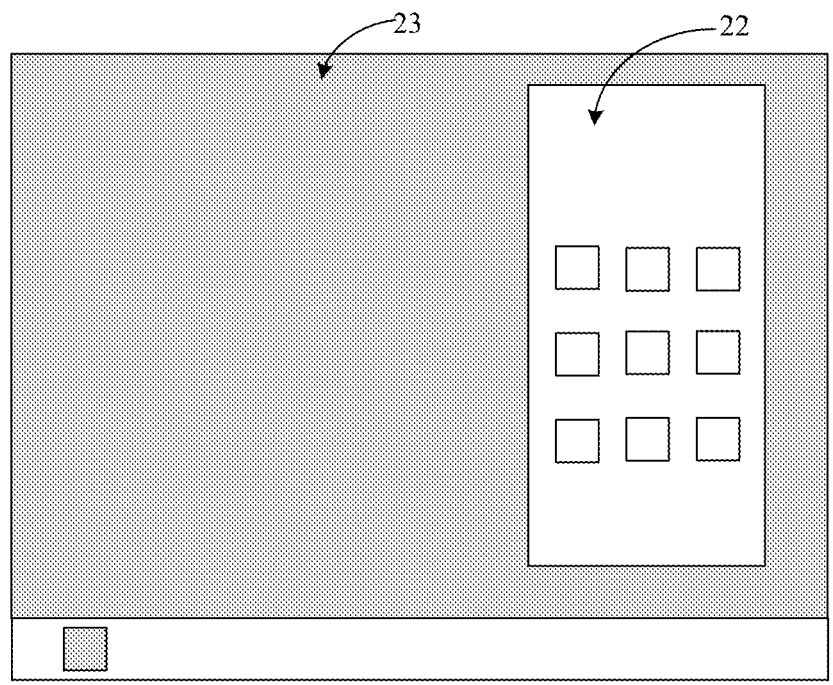
FIG. 7 is a schematic effect diagram showing the second display interface being located over the pop-up window according to one or more examples of the present disclosure.

The second display interface is located over the pop-up window as a whole, the effect of which is shown in FIG. 7. At this time, the second display interface is located over the pop-up window, or the area of the overlapping part between the two is the same as the area of the second display interface.

The second display interface is hidden from display.

Figure 8:
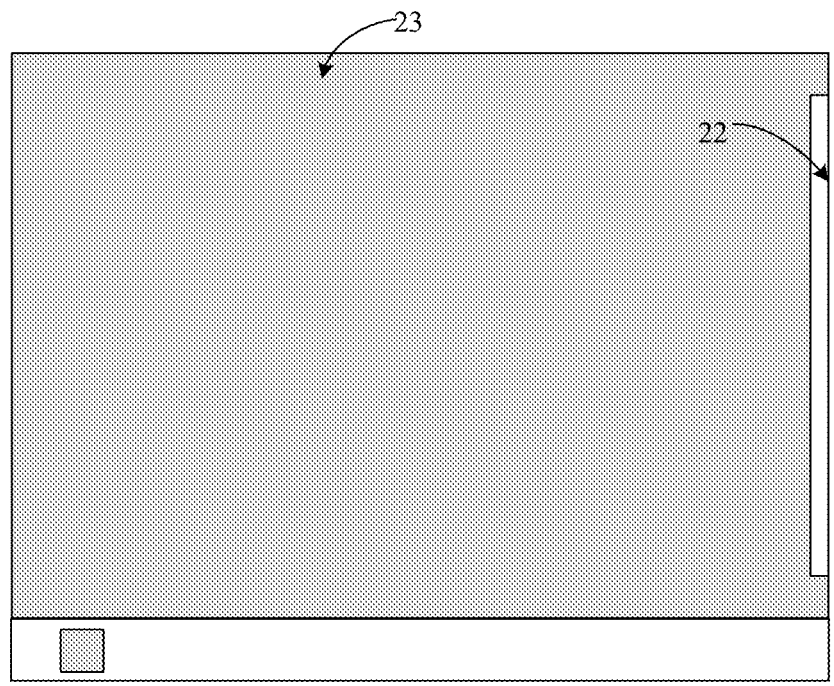
FIG. 8 is a schematic effect diagram showing shrinking of the second display interface at an edge of the first display interface for to hiding according to one or more examples of the present disclosure.
Figure 9:
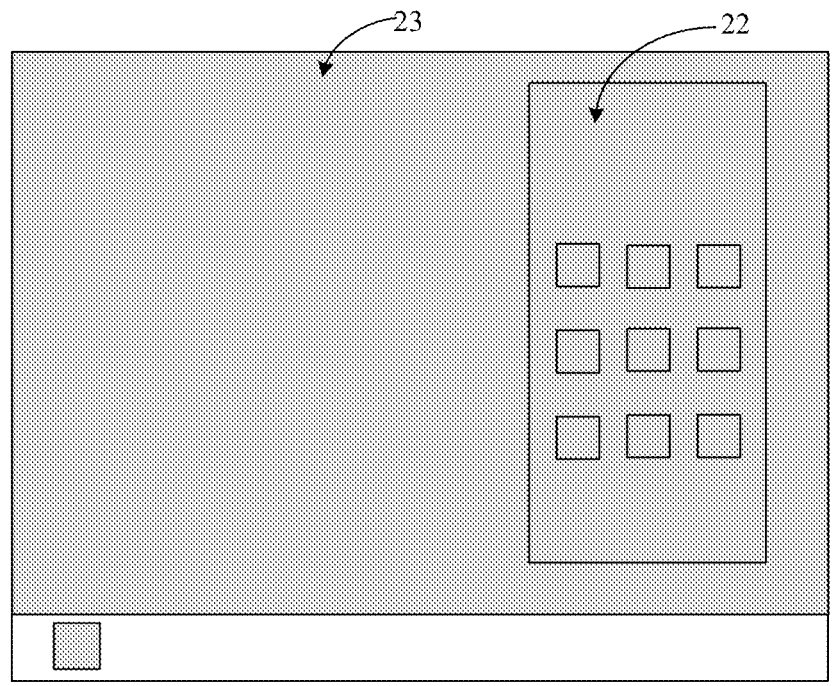
FIG. 9 is a schematic effect diagram showing transparent display and hiding of the second display interface according to one or more examples of the present disclosure.

The hidden display may zoom-out to the boundary of the first display interface or may be transparently displayed. For example, when the second display interface is in a normal mode, and covers the pop-up window in the first display interface, the second display interface may be hidden from display at this time. The effect as shown in FIG. 8 indicates zooming-out to the boundary of the first display interface, and the effect as shown in FIG. 9 indicates being transparently displayed. For another example, when the second display interface is in a front-screen lock mode, and covers the pop-up window in the first display interface, the second display interface remains normally displayed. That is, the second display interface does not need to be hidden from display, so that the second display interface remains above the first display interface.

It should be noted that when a pop-up window is displayed in a freeform mode, the pop-up window includes buttons such as maximize, minimize, and close buttons. When one of the above buttons is triggered, the size and switch state of the pop-up window may be adjusted to meet requirements of different usage scenarios. For example, when watching a video, the maximize button may triggered for operation to display the pop-up window in fullscreen, so as to improve the viewing effect. At this time, the second display interface may be hidden from display. For example, when the above-mentioned pop-up window is not used temporarily, the minimize button may be triggered for operation to minimize display of the pop-up window, such that the effect of switching between display interfaces is achieved. At this time, the second display interface may still be displayed over the first display interface. For another example, when there is no need to use the above-mentioned pop-up window, it may be closed by triggering the close button for operation, so as to close the pop-up window. At this time, the second display interface may still be displayed over the first display interface. For still another example, when the above-mentioned pop-up window is used normally, there is no need to operate the pop-up window. At this time, the second display interface may be displayed side by side with the above-mentioned pop-up window. Alternatively, the pop-up window and the second display interface may be overlapped. Further alternatively, the second display interface may be hidden from display. Those skilled in the art may select the position relationship between the pop-up window and the second display interface according to specific scenarios, and the corresponding solutions fall within the protection scope of the present disclosure.

Figure 10:
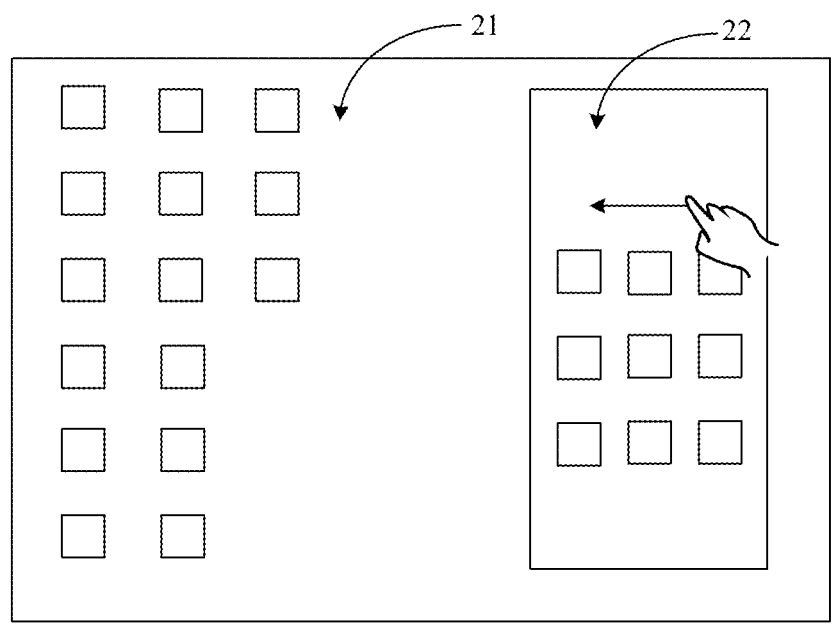
FIG. 10 is a schematic effect diagram showing sliding of the touch screen to switch the display interface in the second display interface according to one or more examples of the present disclosure.
Figure 11:
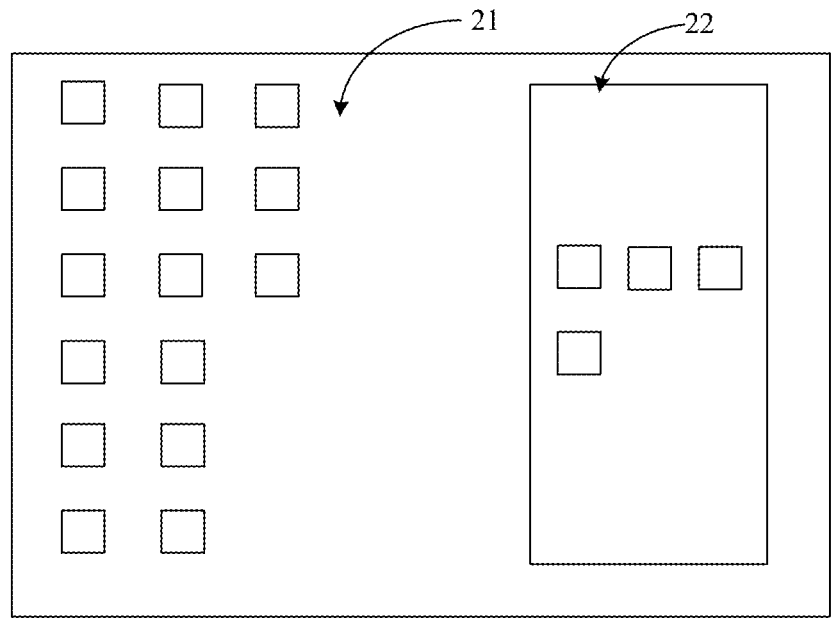
FIG. 11 is a schematic effect diagram showing switching to a target interface according to one or more examples of the present disclosure.

In another example, in response to the trigger event generated by triggering the first display interface, the desktop launcher may acquire an operation type corresponding to the trigger operation. The above-mentioned operation type includes a display interface switch type. When the operation type is the display interface switch type, the desktop launcher may switch the current interface in the first display interface to the target interface corresponding to the trigger event, and the second display interface is located over the first display interface. Referring to FIG. 10, taking the trigger event being slide and switch screen as an example, the user slide to the left in the second display interface (indicated by the arrow direction), and the mobile terminal may switch to the target interface shown in FIG. 11.

Figure 12:
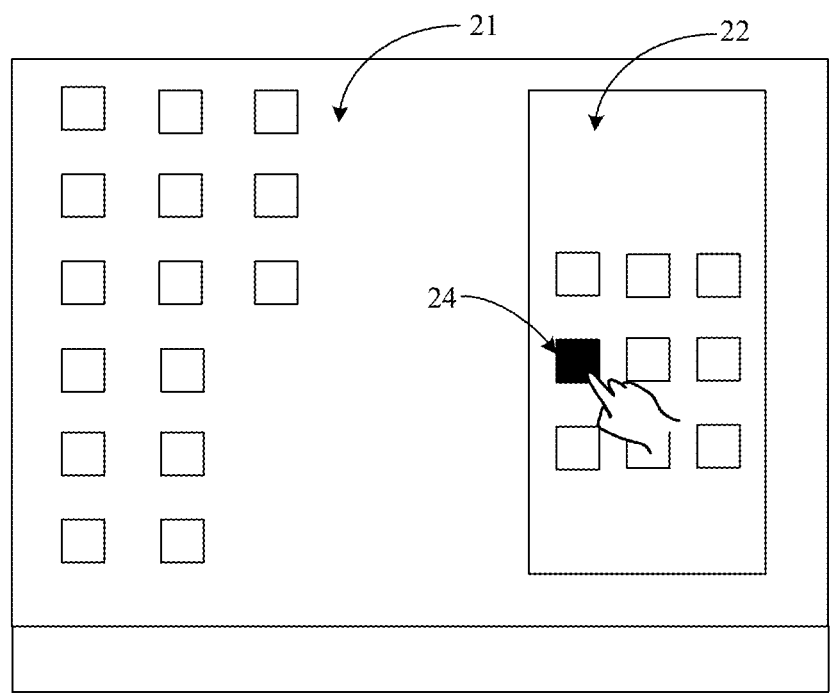
FIG. 12 is a schematic effect diagram showing triggering of an application program startup interface according to one or more examples of the present disclosure.
Figure 13:
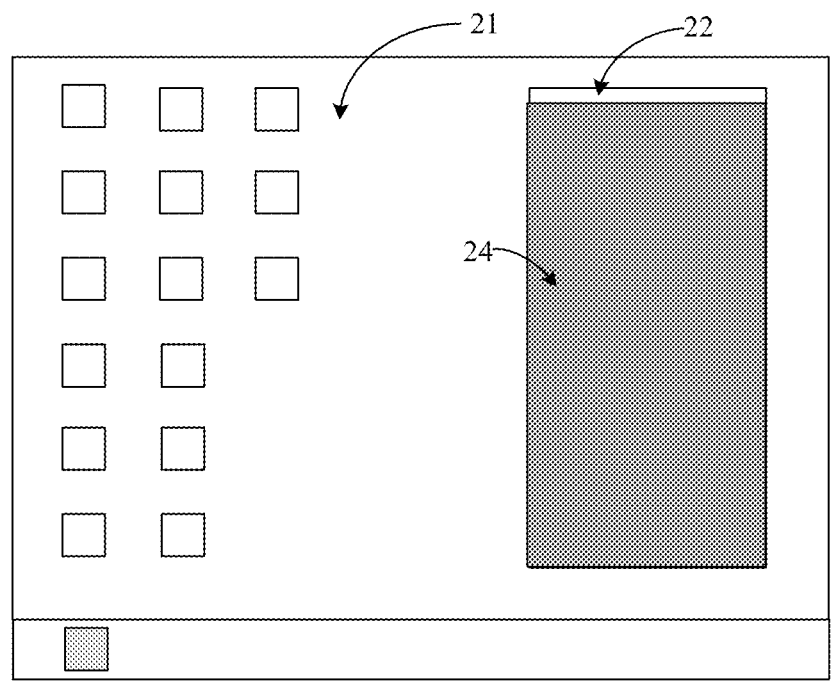
FIG. 13 is a schematic effect diagram showing display of a pop-up window in a second display interface according to one or more examples of the present disclosure.

In yet another example, when the trigger event represents an event generated by triggering the second display interface, the desktop launcher may acquire the operation type corresponding to the trigger operation. The above-mentioned operation type includes an application startup type. In response to the acquired operation type being the application startup type, the desktop launcher may display an interface corresponding to the application in the second display interface. Accordingly, the desktop launcher may display the icon of the above-mentioned application in the task bar of the first display interface. Thus, the user may quickly locate the started application in the corresponding first application interface and/or second application interface through the task bar. Referring to FIG. 12, when the user clicks on the application 24, the interface corresponding to the application may be activated and displayed in fullscreen in the second display interface, the display effect of which is shown in FIG. 13.

It should be noted that the above interface may be displayed in a freeform or fullscreen mode. In practical applications, since the area of the second display area is usually small, the user's view requirements may be met by displaying the interface in a fullscreen mode, and the viewing experience may be improved.

In yet another example, when the trigger event represents an event generated by triggering the second display interface, the desktop launcher may acquire the operation type corresponding to the trigger operation. The above-mentioned operation type includes a display interface switch type. When the operation type is the display interface switch type, the desktop launcher may switch the current interface in the second display interface to the target interface corresponding to the trigger event, as shown in FIG. 9 and FIG. 10.

So far, in the solutions provided by examples of the present disclosure, a trigger event may be acquired. The trigger event includes at least one of the following: an event generated by triggering the first display interface, and an event generated by triggering the second display interface. Then, the target display area corresponding to the trigger event is acquired. The target display area includes at least one of the following: a first display area located within the first display interface, and a second display area located within the second display interface. After that, the trigger event is reported to the desktop launcher of the display interface corresponding to the target display area, such that the desktop launcher starts an interface corresponding to the trigger event in the target display area. In this way, according to an example, only two display interfaces may be set on the same display screen, and each display interface may display different display systems. Thus, it is convenient for users to select different display interfaces and/or display systems according to their own usage habits, thereby being beneficial to reduce the difficulty of operation and improve the user experience.

A display control method provided by an example is described below in conjunction with an actual application scenario.

After the mobile terminal is started, the desktop interface may be displayed according to an existing logic. At this time, the mobile terminal has the first desktop launcher, Launcher. During this process, the display screen of the mobile terminal may detect the trigger operation of the user. For example, the trigger operation includes long press and slide.

When the hardware drive layer of the mobile terminal detects the trigger operation, it may determine that the trigger event is detected, and the system server process in the operating system processes the trigger event. Besides, the trigger event is dispatched to the first desktop launcher, Launcher.

When the first desktop launcher, Launcher, determines that the operation type of the trigger operation is an application startup type, the desktop launcher may display a pop-up window in a freeform mode in the first display interface. Alternatively, when the first desktop launcher, Launcher, determines that the operation type of the trigger operation is a display interface switch type, the desktop launcher may switch the current interface in the first display interface to the target interface corresponding to the trigger event.

When the user requires fro dual-screen display, the user may select the menu bar and the "dual-screen" option in the menu bar, and continue to select the "OK" option. After detecting that the dual-screen option is triggered for operation, the mobile terminal may complete the dual-screen configuration operation. After the dual-screen configuration operation, the mobile terminal may create a virtual display at the operating system layer, such that the virtual display correspond to another display interface of the display screen, thereby acquiring a second display interface.

The display screen of the mobile terminal may continue to detect the trigger event. After the trigger event is detected, (inputDispatcher of) the system server process in the operating system will process the above trigger event to acquire the target display area corresponding to the trigger event, that is, to acquire the identification code (displayID) of the display screen. Then, the trigger event is reported to the desktop launcher corresponding to the target display area according to the above identification code (displayID), so that the desktop launcher starts an interface corresponding to the trigger event in the target display area.

When the user does not require for dual-screen display, the user may select the menu bar and the "dual-screen" option in the menu bar, and continue to select the "cancel" option. After detecting that the dual-screen option is canceled, the mobile terminal may complete the operation of canceling the dual-screen configuration.

In an example, the user is allowed to select or cancel the dual-screen function. When the dual-screen function is selected, two display interfaces may be displayed on the display screen of the mobile terminal. The user may select a corresponding interface to operate according to his own needs, which is beneficial to improve operation efficiency and user experience.

On the basis of a display control method provided by an example of the present disclosure, another example of the present disclosure further provides a display control device, which is applied to a mobile terminal. The mobile terminal includes a first display interface, a second display interface, and a desktop launcher. The second display interface is located over the first display interface, and the display systems of the first display interface and the second display interface are different.

Figure 14:
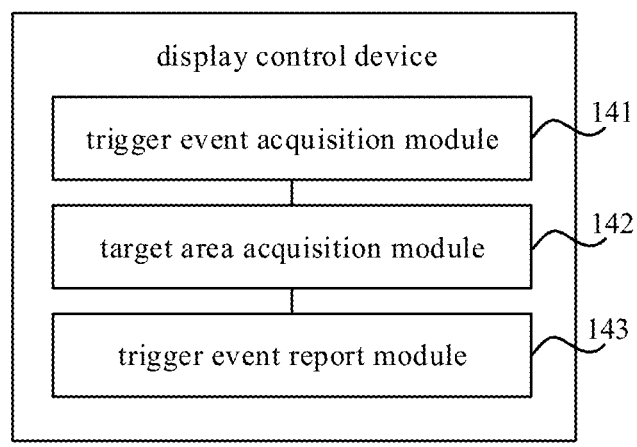
FIG. 14 is a block diagram of a display control device according to one or more examples of the present disclosure.

With reference to FIG. 14, the display control device includes:

a trigger event acquisition module 141, configured to acquire a trigger event, where the trigger event includes at least one of the following: an event generated by triggering a first display interface, and an event generated by triggering a second display interface;

a target area acquisition module 142, configured to acquire a target display area corresponding to the trigger event, where the target display area includes at least one of the following: a first display area located within the first display interface, and a second display area located within the second display interface; and a trigger event report module 143, configured to report the trigger event to the desktop launcher corresponding to the target display area, so that the desktop launcher starts the interface corresponding to the trigger event in the target display area.

In an example, the display control device further includes: a virtual display acquisition module, configured to, before acquiring the trigger event, create a virtual display at the operating system layer of the mobile terminal, such that the virtual display corresponds to the second display interface.

In an example, the trigger event report module includes: a type acquisition unit, configured to, in response to the trigger event generated by triggering the first display interface, acquire an operation type corresponding to the trigger operation; and a pop-up window display unit, configured to, in response to the acquired operation type being an application startup type, display a pop-up window in the first display interface, such that the pop-up window and the second display interface are arranged according to a target position relationship.

The target position relationship includes at least one of the following: the pop-up window being juxtaposed with the second display interface, the pop-up window and the second display interface overlapping with each other, the second display interface being located over the pop-up window as a whole, and the second display interface being hidden from display.

In an example, the trigger event report module includes: a type acquisition unit, configured to, in response to the trigger event generated by triggering the first display interface, acquire an operation type corresponding to the trigger operation; and an interface switch unit, configured to, in response to the acquired operation type being the display interface switch type, switch the current interface in the first display interface to the target interface corresponding to the trigger event, where the second display interface is located over the first display interface.

In an example, the trigger event report module includes: a type acquisition unit, configured to, in response to the trigger event generated by triggering the second display interface, acquire the operation type corresponding to the trigger operation; and a pop-up window display unit, configured to, in response to the acquired operation type being an application startup type, display an interface corresponding to the application in the second display interface.

In an example, the trigger event report module includes: a type acquisition unit, configured to, in response to the trigger event generated by triggering the second display interface, acquire the operation type corresponding to the trigger operation; and an interface switch unit, configured to, in response to the acquired operation type being the display interface switch type, switch the current interface in the second display interface to the target interface corresponding to the trigger event.

It should be noted that the display control device shown in an example matches the content of the display control method example shown in FIG. 1, and the content of the foregoing method example may be referred to, details of which are not repeated herein.

Figure 15:
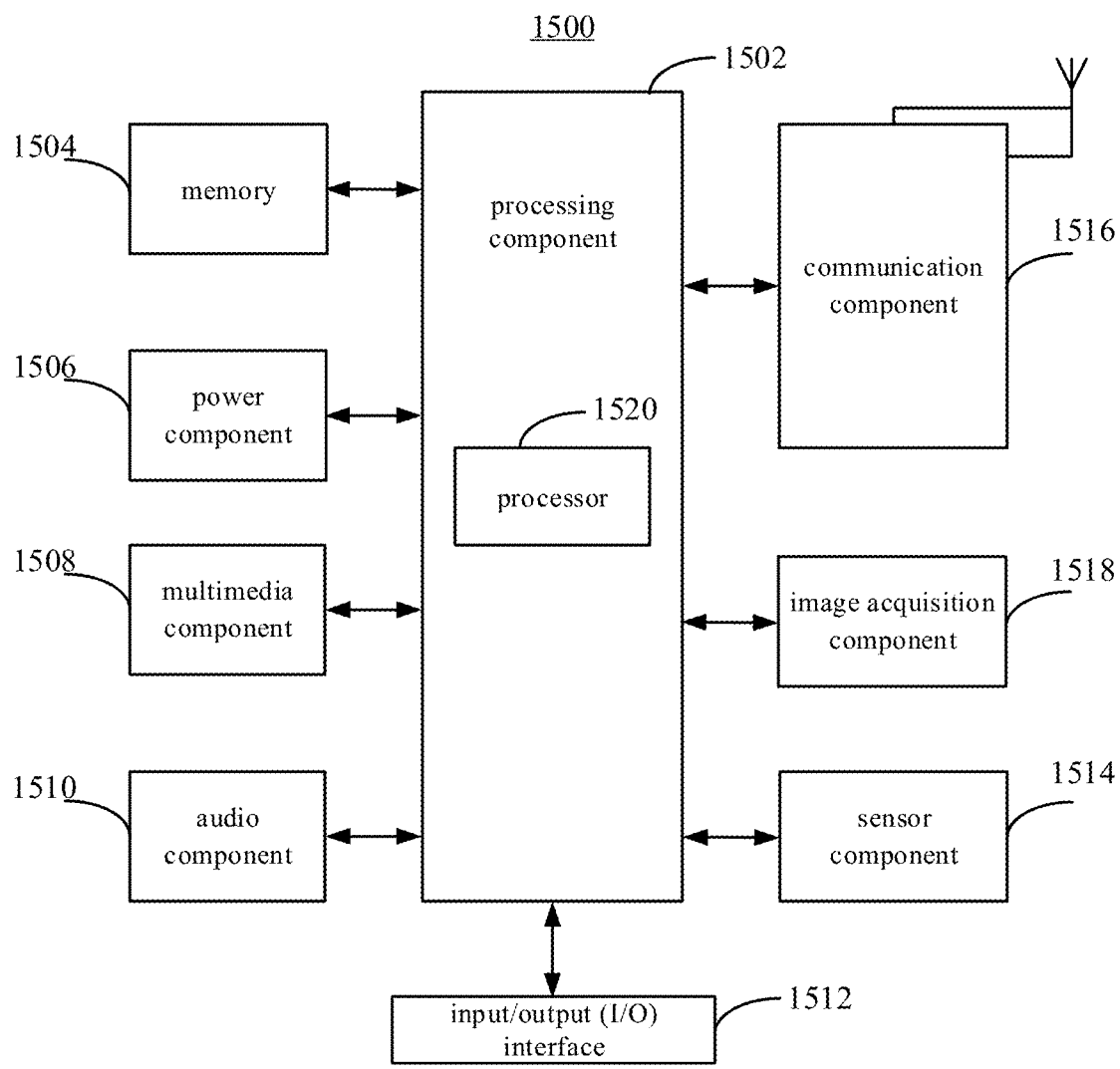
FIG. 15 is a block diagram of a mobile terminal according to one or more examples of the present disclosure.

FIG. 15 is a block diagram of a mobile terminal according to an example. For example, the mobile terminal 1500 may be a smart phone, a computer, a digital broadcast terminal, a tablet device, a medical device, a fitness device, a personal digital assistant, and the like.

With reference to FIG. 15, the mobile terminal 1500 may include one or more of the following components: a processing component 1502, a memory 1504, a power component 1506, a multimedia component 1508, an audio component 1510, an input/output (I/O) interface 1512, a sensor component 1514, communication component 1516, and an image acquisition component 1518.

The processing component 1502 generally controls the overall operations of the mobile terminal 1500, such as operations associated with display, phone calls, data communications, camera operations, and recording operations. The processing component 1502 may include one or more processors 1520 to execute computer programs. Additionally, the processing component 1502 may include one or more modules that facilitate interactions between the processing component 1502 and other components. For example, the processing component 1502 may include a multimedia module to facilitate interactions between the multimedia component 1508 and the processing component 1502.

The memory 1504 is configured to store various types of data to support operations at the mobile terminal 1500. Examples of such data include computer programs for any application or method operating on the mobile terminal 1500, contact data, phonebook data, messages, pictures, videos, and the like. The memory 1504 may be implemented by any type of volatile or non-volatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 1506 provides power to various components of the mobile terminal 1500. The power component 1506 may include a power management system, one or more power supplies, and other components associated with generating, managing, and distributing power to the mobile terminal 1500. The power component 1506 may include a power chip, and the controller may communicate with the power chip, so as to control the power chip to turn on or off the switch device, so that the battery supplies or does not supply power to the mainboard circuit.

The multimedia component 1508 includes a screen that provides an output interface between the mobile terminal 1500 and a target object. In some examples, the screen may include a liquid crystal display (LCD) and a touch panel (TP). If the screen includes a touch panel, the screen may be implemented as a touch screen to receive input information from a target object. The touch panel includes one or more touch sensors to sense touch, slide, and gestures on the touch panel. The touch sensor may sense not only the boundary of a touch or slide operation, but also the duration and pressure associated with the touch or slide operation.

The audio component 1510 is configured to output and/or input audio file information. For example, the audio component 1510 includes a microphone (MIC). The microphone is configured to receive external audio file information when the mobile terminal 1500 is in an operation mode, such as a calling mode, a recording mode, and a voice recognition mode. The received audio file information may be further stored in the memory 1504 or transmitted via the communication component 1516. In some examples, the audio component 1510 also includes a speaker for outputting the audio file information.

The I/O interface 1512 provides an interface between the processing component 1502 and a peripheral interface module, which may be a keyboard, a click wheel, a button, or the like.

The sensor component 1514 includes one or more sensors for providing various aspects of status assessment for the mobile terminal 1500. For example, the sensor component 1514 may detect the open/closed state of the mobile terminal 1500, and the relative positioning among components (such as display screen and keypad of the mobile terminal 1500). The sensor component 1514 may further detect the position change of the mobile terminal 1500 or a component, the presence or absence of contact between the target object and the mobile terminal 1500, the orientation or acceleration/deceleration of the mobile terminal 1500, and the temperature change of the mobile terminal 1500. In an example, the sensor component 1514 may include a magnetic force sensor, a gyroscope, and a magnetic field sensor. The magnetic field sensor includes at least one of the following: a Hall sensor, a thin film magnetoresistive sensor, and a magnetic liquid acceleration sensor.

The communication component 1516 is configured to facilitate wired or wireless communications between the mobile terminal 1500 and other devices. The mobile terminal 1500 may access a wireless network based on a communication standard, such as WiFi, 2G, 3G, 4G, 5G, or a combination thereof. In an example, the communication component 1516 receives broadcast information or broadcast-related information from an external broadcast management system via a broadcast channel. In an example, the communication component 1516 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an example, the mobile terminal 1500 may be implemented by one or more application specific integrated circuits (ASICs), digital information processors (DSPs), digital information processing devices (DSPDs), programmable logic devices (PLDs), field programmable gate arrays (FPGA), controllers, microcontrollers, microprocessors or other electronic components.

In an example, there is also provided a non-transitory readable storage medium containing an executable computer program, such as a memory 1504 containing instructions that may be executed by a processor. The readable storage medium may be ROM, random access memory (RAM), CD-ROM, magnetic tape, floppy disk, optical data storage device, and the like.

The technical solutions provided by examples of the present disclosure may include the following beneficial effects.

As can be seen from the above examples, in the solutions provided by examples of the present disclosure, a trigger event may be obtained. The trigger event includes at least one of the following: an event generated by triggering the first display interface, and an event generated by triggering the second display interface. Then, a target display area corresponding to the trigger event is acquired. The target display area includes at least one of the following: a first display area located within the first display interface, and a second display area located within the second display interface. After that, the trigger event is reported to the desktop launcher corresponding to the target display area, so that the desktop launcher starts the interface corresponding to the trigger event in the target display area. In this way, in an example, only two display interfaces may be set on the same display screen, and each display interface may display different display systems. Thus, it is convenient for users to select different display interfaces and/or display systems according to their own usage habits, thereby being beneficial to reduce the difficulty of operation and improve the user experience.

The present disclosure provides a display control method and system, a mobile terminal, and a storage medium to solve deficiencies in the related art.

According to a first aspect of the present disclosure, a display control method is provided, applied to a mobile terminal. The mobile terminal includes a first display interface, a second display interface and a desktop launcher. The second display interface is located over the first display interface. The display systems of the first display interface and the second display interface are different.

The display control method includes: acquiring a trigger event, the trigger event including at least one of an event generated by triggering the first display interface and an event generated by triggering the second display interface; acquiring a target display area corresponding to the trigger event, the target display area including at least one of a first display area located within the first display interface and a second display area located within the second display interface area; and reporting the trigger event to the desktop launcher corresponding to the target display area, such that the desktop launcher starts an interface corresponding to the trigger event in the target display area.

Optionally, before acquiring the trigger event, the method further includes: creating a virtual display at the operating system layer of the mobile terminal, such that the virtual display corresponds to the second display interface.

Optionally, the desktop launcher starting the interface corresponding to the trigger event in the target display area, includes: in response to the trigger event generated by triggering the first display interface, acquiring the operation type corresponding to the trigger operation; in response to the acquired operation type being an application startup type, displaying a pop-up window in the first display interface, such that the pop-up window and the second display interface are arranged based on a target position relationship.

The target position relationship includes at least one of: the pop-up window being juxtaposed with the second display interface; the pop-up window overlapping with the second display interface; the second display interface being located over the pop-up window as a whole; and the second display interface being hidden from display.

Optionally, the desktop launcher starting the interface corresponding to the trigger event in the target display area, includes: in response to the trigger event generated by triggering the first display interface, acquiring the operation type corresponding to the trigger operation; and in response to the acquired operation type being a display interface switch type, switching the current interface in the first display interface to the target interface corresponding to the trigger event, where the second display interface is located over the first display interface.

Optionally, the desktop launcher starting the interface corresponding to the trigger event in the target display area, includes: in response to the trigger event generated by triggering the second display interface, acquiring the operation type corresponding to the trigger operation; and in response to the acquired operation type being an application startup type, displaying an interface corresponding to an application in the second display interface.

Optionally, the first display interface further includes a task bar. The method further includes: in response to displaying the interface corresponding to the application in the second display interface, displaying an icon of the application in the task bar.

Optionally, the desktop launcher starting the interface corresponding to the trigger event in the target display area, includes: in response to the trigger event generated by triggering the second display interface, acquiring the operation type corresponding to the trigger operation; and in response to the acquired operation type being the display interface switch type, switching the current interface in the second display interface to the target interface corresponding to the trigger event.

According to a second aspect of the present disclosure, there is provided a display control device, which is applied to a mobile terminal. The mobile terminal includes a first display interface, a second display interface, and a desktop launcher. The second display interface is located over the first display interface. The display systems of the first display interface and the second display interface are different.

The display control device includes: a trigger event acquisition module, configured to acquire a trigger event, the trigger event including at least one of an event generated by triggering the first display interface and an event generated by triggering the second display interface; a target area acquisition module, configured to acquire a target display area corresponding to the trigger event, the target display area including at least one of a first display area located within the first display interface and a second display area located within the second display interface; and a trigger event report module, configured to report the trigger event to the desktop launcher corresponding to the target display area, such that the desktop launcher starts an interface corresponding to the trigger event in the target display area.

Optionally, the display control device further includes: a virtual display acquisition module, configured to, before acquiring the trigger event, create a virtual display at the operating system layer of the mobile terminal, such that the virtual display corresponds to the second display interface.

Optionally, the trigger event report module includes: a type acquisition unit, configured to, in response to the trigger event generated by triggering the first display interface, acquire an operation type corresponding to the trigger operation; and a pop-up window display unit, configured to, in response to the acquired operation type being an application startup type, display a pop-up window in the first display interface, such that the pop-up window and the second display interface are arranged based on a target position relationship.

The target position relationship includes at least one of: the pop-up window being juxtaposed with the second display interface; the pop-up window overlapping with the second display interface; the second display interface being located over the pop-up window as a whole; and the second display interface being hidden from display.

Optionally, the trigger event report module includes: a type acquisition unit, configured to, in response to the trigger event generated by triggering the first display interface, acquire an operation type corresponding to the trigger operation; and an interface switch unit, configured to, in response to the acquired operation type being the display interface switch type, switch the current interface in the first display interface to the target interface corresponding to the trigger event, where the second display interface is located over the first display interface.

Optionally, the trigger event report module includes: a type acquisition unit, configured to, in response to the trigger event generated by triggering the second display interface, acquire the operation type corresponding to the trigger operation; and a pop-up window display unit, configured to, in response to the acquired operation type being an application startup type, display an interface corresponding to an application in the second display interface.

Optionally, the first display interface further includes a task bar. The trigger event report module further includes: an icon display unit, configured to, in response to displaying the interface corresponding to the application in the second display interface, display the icon of the application in the task bar.

Optionally, the trigger event report module includes: a type acquisition unit, configured to, in response to the trigger event generated by triggering the second display interface, acquire the operation type corresponding to the trigger operation; and an interface switch unit, configured to, in response to the acquired operation type being the display interface switch type, switch the current interface in the second display interface to the target interface corresponding to the trigger event.

According to a third aspect of the present disclosure, a mobile terminal is provided, including: a processor; and a memory, configured to store a computer program executable by the processor, where the processor is configured to run the computer program in the memory to implement the display control method according to any of the above examples.

According to a fourth aspect of the present disclosure, a computer-readable storage medium is provided. When an executable computer program in the storage medium is run by a processor, the display control method as described in any one of the foregoing examples is implemented.

Other examples of the present disclosure will readily occur to those skilled in the art upon consideration of the instant specification and practice of the present disclosure disclosed herein. The present disclosure is intended to cover any modifications, uses or adaptations that follow the general principle of the present disclosure and include common general knowledge or techniques in the technical field not disclosed by the present disclosure. The specification and examples are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

The invention claimed is:
1. A display control method, comprising:
    acquiring, by a mobile terminal, a trigger event, wherein the trigger event comprises at least one of: an event generated by triggering a first display interface of the mobile terminal, or an event generated by triggering a second display interface of the mobile terminal, wherein the second display interface is disposed over the first display interface, and the first display interface and the second display interface comprise different display systems;
    acquiring a target display area corresponding to the trigger event, wherein the target display area comprises at least one of: a first display area located within the first display interface, or a second display area located within the second display interface; and
    reporting the trigger event to a desktop launcher of the mobile terminal corresponding to the target display area, wherein the desktop launcher starts an interface corresponding to the trigger event in the target display area,
    wherein the desktop launcher starting the interface corresponding to the trigger event in the target display area, comprises:
    in response to the trigger event generated by triggering the first display interface, acquiring an operation type corresponding to the trigger operation; and
    in response to acquired operation type being an application startup type, displaying an application interface in the second display interface,
    wherein the first display interface further comprises a task bar; and
    wherein the method further comprises:
        in response to displaying the application interface in the second display interface, displaying an icon in the task bar, so that an application corresponding to the application interface displayed in the second display interface is located through the icon in the task bar of the first display interface.
2. The display control method according to claim 1, further comprising:
    creating a virtual display at an operating system layer of the mobile terminal, wherein the virtual display corresponds to the second display interface.

3. The display control method according to claim 1, wherein the desktop launcher starting the interface corresponding to the trigger event in the target display area, comprises:

in response to the trigger event generated by triggering the first display interface, acquiring an operation type corresponding to the trigger operation; and in response to acquired operation type being an application startup type, displaying a pop-up window in the first display interface, wherein the pop-up window and the second display interface are arranged based on a target position relationship, wherein the target position relationship comprises at least one of: the pop-up window being juxtaposed with the second display interface, the pop-up window overlapping with the second display interface, the second display interface being located over the pop-up window as a whole, or the second display interface being hidden from display.

4. The display control method according to claim 1, wherein the desktop launcher starting the interface corresponding to the trigger event in the target display area, comprises:

in response to the trigger event generated by triggering the first display interface, acquiring an operation type corresponding to the trigger operation; and in response to acquired operation type being a display interface switch type, switching a current interface in the first display interface to a target interface corresponding to the trigger event, wherein the second display interface is located over the first display interface.

5. The display control method according to claim 1, wherein the desktop launcher starting the interface corresponding to the trigger event in the target display area, comprises:

in response to the trigger event generated by triggering the second display interface, acquiring an operation type corresponding to the trigger operation; and in response to acquired operation type being a display interface switch type, switching a current interface in the second display interface to a target interface corresponding to the trigger event.

6. A mobile terminal, comprising:

a first display interface, a second display interface and a desktop launcher, wherein the second display interface is located over the first display interface, and the first display interface and the second display interface comprise different display systems;

a processor; and a memory, configured to store a computer program executable by the processor, wherein the processor is configured to run the computer program in the memory to implement a display control method, comprising:

acquiring a trigger event, wherein the trigger event comprises at least one of: an event generated by triggering the first display interface, or an event generated by triggering the second display interface;

acquiring a target display area corresponding to the trigger event, wherein the target display area comprises at least one of: a first display area located within the first display interface, or a second display area located within the second display interface; and reporting the trigger event to the desktop launcher corresponding to the target display area, wherein the desktop launcher starts an interface corresponding to the trigger event in the target display area, wherein the desktop launcher starting the interface corresponding to the trigger event in the target display area, comprises:

in response to the trigger event generated by triggering the first display interface, acquiring an operation type corresponding to the trigger operation; and in response to acquired operation type being an application startup type, displaying an application interface in the second display interface, wherein the first display interface further comprises a task bar; and wherein the method further comprises:

in response to displaying the application interface in the second display interface, displaying an icon in the task bar, so that an application corresponding to the application interface displayed in the second display interface is located through the icon in the task bar of the first display interface.

7. The mobile terminal according to claim 6, wherein the display control method further comprises:

creating a virtual display at an operating system layer of the mobile terminal, wherein the virtual display corresponds to the second display interface.

8. The mobile terminal according to claim 6, wherein the desktop launcher starting the interface corresponding to the trigger event in the target display area, comprises:

in response to the trigger event generated by triggering the first display interface, acquiring an operation type corresponding to the trigger operation; and in response to acquired operation type being an application startup type, displaying a pop-up window in the first display interface, wherein the pop-up window and the second display interface are arranged based on a target position relationship, wherein the target position relationship comprises at least one of: the pop-up window being juxtaposed with the second display interface, the pop-up window overlapping with the second display interface, the second display interface being located over the pop-up window as a whole, or the second display interface being hidden from display.

9. The mobile terminal according to claim 6, wherein the desktop launcher starting the interface corresponding to the trigger event in the target display area, comprises:

in response to the trigger event generated by triggering the first display interface, acquiring an operation type corresponding to the trigger operation; and in response to acquired operation type being a display interface switch type, switching a current interface in the first display interface to a target interface corresponding to the trigger event, wherein the second display interface is located over the first display interface.

10. A non-transitory computer-readable storage medium, wherein an executable computer program in the computer-readable storage medium is configured to, when run by a processor, implement a display control method, comprising:

acquiring, by a mobile terminal, a trigger event, wherein the trigger event comprises at least one of: an event generated by triggering a first display interface of the mobile terminal, or an event generated by triggering a second display interface of the mobile terminal, wherein the second display interface is disposed over the first display interface, and the first display interface and the second display interface comprise different display systems;

acquiring a target display area corresponding to the trigger event, wherein the target display area comprises at least one of: a first display area located within the first display interface, or a second display area located within the second display interface; and reporting the trigger event to a desktop launcher of the mobile terminal corresponding to the target display area, wherein the desktop launcher starts an interface corresponding to the trigger event in the target display area, wherein the desktop launcher starting the interface corresponding to the trigger event in the target display area, comprises:

in response to the trigger event generated by triggering the first display interface, acquiring an operation type corresponding to the trigger operation; and in response to acquired operation type being an application startup type, displaying an application interface in the second display interface, wherein the first display interface further comprises a task bar; and wherein the method further comprises:
  in response to displaying the application interface in the second display interface, displaying an icon in the task bar, so that an application corresponding to the application interface displayed in the second display interface is located through the icon in the task bar of the first display interface.

* * * * *